United States Patent [19]
Festerling

[11] 3,872,530
[45] Mar. 25, 1975

[54] APPARATUS FOR THE AUTOMATIC FITTING OF A CAPTIVE MEMBER ON A MECHANICAL PART

[75] Inventor: Heinz Festerling, Hannover, Germany

[73] Assignee: Weltpat Anstalt, Vaduz, Liechtenstein

[22] Filed: May 22, 1973

[21] Appl. No.: 362,766

[30] Foreign Application Priority Data
Aug. 16, 1972 Switzerland.................... 12110/72

[52] U.S. Cl. .......................... 10/155 A, 29/208 R
[51] Int. Cl. ........................................... B23p 19/08
[58] Field of Search......... 29/429, 208 R; 10/155 R, 10/155 A, 165

[56] References Cited
UNITED STATES PATENTS

| | | | |
|---|---|---|---|
| 1,606,432 | 11/1926 | Herkenhine...................... | 29/208 R |
| 2,333,940 | 11/1943 | Kuehlman........................ | 10/155 A |
| 2,728,091 | 12/1955 | Hoenk............................... | 29/208 R |
| 2,914,780 | 12/1959 | Poupitch.......................... | 10/155 A |
| 2,914,781 | 12/1959 | Prutton............................. | 29/208 R |
| 3,052,969 | 9/1962 | Loven............................... | 10/155 A |
| 3,112,562 | 12/1963 | Wilson.............................. | 29/430 |
| 3,225,370 | 12/1965 | Pipes................................ | 29/208 R |

Primary Examiner—C. W. Lanham
Assistant Examiner—Dan C. Crane
Attorney, Agent, or Firm—Robert E. Burns; Emmanuel J. Lobato; Bruce L. Adams

[57] ABSTRACT

A vibrating bowl is adapted to feed captive members, for example washers, along a tube having an outlet end disposed lower than the inlet end. The outlet end of the tube has a sleeve with lips preventing the captive members from exiting from the outlet end of the tube except when one end of a mechanical part, such as a bolt blank, the other end of which mechanical part slides down an inclined slideway, picks-up the top most captive member by sliding between said lips. A guide embracing said sleeve and lips and inclined relative to said slideway receives each top most captive member in turn and serves to move such member progressively towards said other end of said mechanical part as the latter continues to slide down said slideway.

7 Claims, 4 Drawing Figures

APPARATUS FOR THE AUTOMATIC FITTING OF A CAPTIVE MEMBER ON A MECHANICAL PART

The invention relates to a process for the automatic fitting of a captive member on a mechanical part, for example a captive washer on an unthreaded bolt blank, or on a threaded bolt or screw, or of any member which has to be associated in an undetachable manner with a mechanical part.

According to the invention apparatus for the automatic fitting of a captive member on a mechanical part comprises a. means for forming a vertical pile of said captive members which means presents said captive members one by one in an orderly manner to a pick-up station situated at the top of the vertical pile;

b. an inclined slideway passing over said pick-up station and one end of said mechanical parts being engaged in said slideway so that as said parts slide theredown the other end of each mechanical part in turn passes said pick-up station and engages and picks-up the top most captive member of the pile thereof, and c. a guide embracing said pick-up station and so inclined with respect to said slideway that each captive member upon becoming engaged on the other end of a corresponding mechanical part is moved along said guide and is progressively moved towards said one end of the corresponding mechanical part as the part continues moving down said slideway.

The accompanying drawing illustrates, by way of example, one embodiment of the invention, adapted for fitting a captive washer to the body of a bolt blank.

Figure 1:
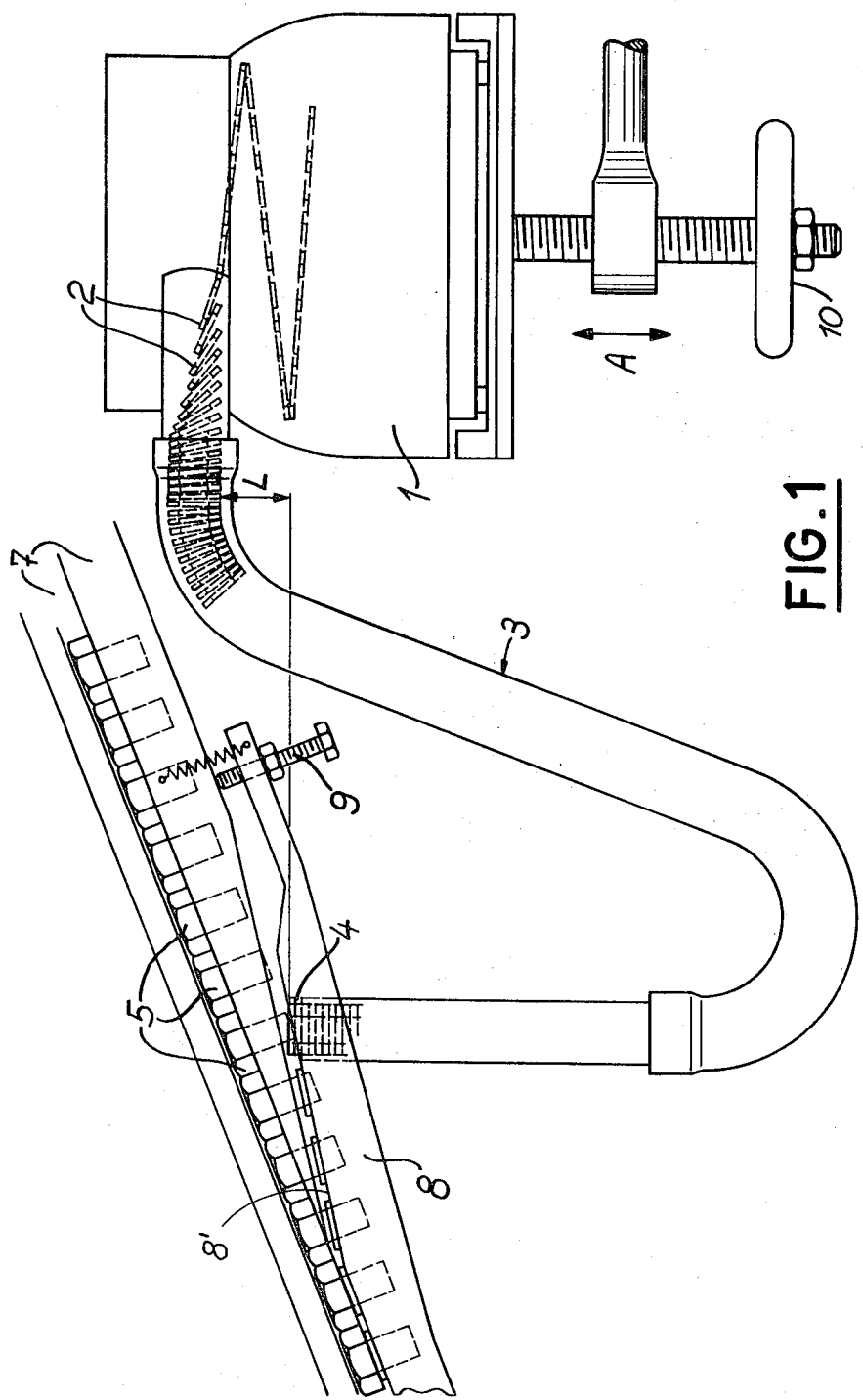
FIG. 1 is a view in elevation of the device.

The device illustrated in FIG. 1 comprises a vibrating bowl 1 for supplying washers 2. By rotation and vibration, these washers rise to the upper portion of the bowl 1 and enter a tube 3, which is preferably flexible, for example of P.V.C. or any other suitable material.

The vibrations of the bowl 1 are transmitted to the flexible tube 3, and the washers 2 are stacked up one on top of the other in a continuous manner. A difference in level L is provided between the end of the tube 3 nearest the exit from the bowl 1 and the other end of the tube 3 in order that the washers 2 may be able to leave at said other end of this tube, by gravity, being aided in this movement by the vibrations transmitted to the tube 3 by the bowl 1.

Figure 2:
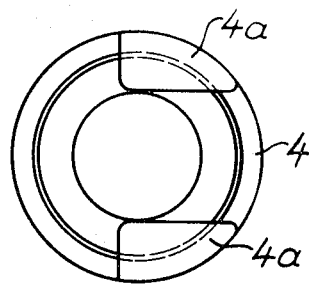
FIG. 2 is a fragmentary plan view of a detail.
Figure 3:
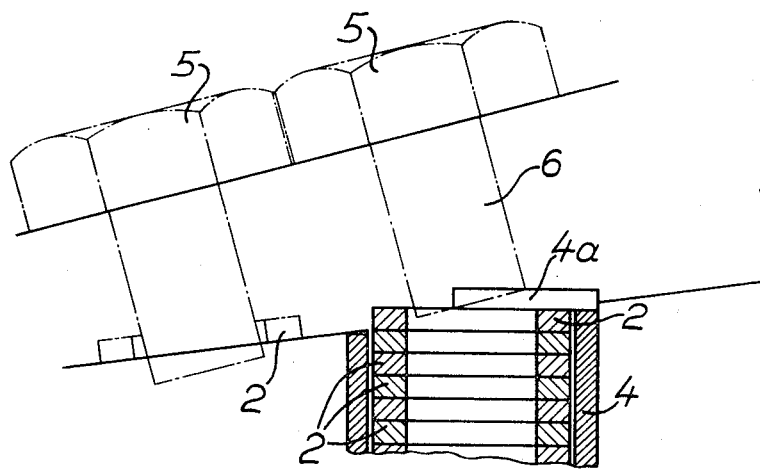
FIG. 3 is a view in elevation and partly in central vertical section of the detail of FIG. 2.

A pick-up station shown as including a vertical sleeve 4, the end of which is illustrated in detail in FIGS. 2 and 3, has a vertical pile of washers 2 formed therein and generally rising therein, but temporarily stops the washers from emerging on their own, whereby this sleeve presents the washers one at a time in front of each shank 6 of each bolt blank 5 which it is required to equip with a washer.

This sleeve 4, which is tubular and cylindrical, has an internal diameter slightly larger than the external diameter of the washers 2. Its free end terminates in two lips 4a holding the uppermost washer. These two lips are separated by a space corresponding to the diameter of the shank 6 of the bolts 5.

The device also comprises an inclined slideway 7 in which the bolts 5 are held by their heads. This slideway is disposed in such a manner that the shanks 6 of the bolts pass between the lips 4a of the sleeve 4.

The operation of the device is as follows:

The bolts 5 are conveyed by the inclined slideway 7. During this displacement, the end of each shank 6 of each bolt passes in turn between the lips 4a of the sleeve 4 and a washer 2 is engaged on each shank and then slides on top surfaces 8' of guide rack means 8 converging with the slideway 7, as shown, at an acute angle. Each washer 2 is thus pushed back progressively, in time with the displacement of a corresponding bolt, until it assumes a position below the head of this bolt.

Each bolt blank, thus equipped with a washer, is then collected, at the exit from the slideway 7, and conveyed to a compression threading machine. This conveying and this machine are known and are not described here.

Figure 4:
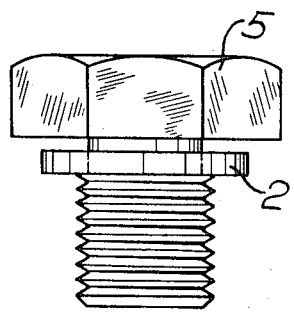
FIG. 4 is a view of a bolt equipped with a captive washer obtained by means of the device according to the invention.

The thread, obtained by compression, has an external diameter larger than the diameter of the shank of a bolt before threading; the external diameter of the thread is larger than the hole in the washer which thus remains captive, as illustrated in FIG. 4.

In order to be able to regulate the delivery of the washers 2, provision has been made for varying the horizontal distance between the exit from the bowl 1 and the end of tube 3 dispensing washers by raising or lowering the bowl 1 in accordance with the arrows A by means of the handwheel 10.

In order to regulate with precision the grasping of a washer 2 by the shank 6 of each bolt, a micrometric regulation 9 has been provided, enabling the height below the head of the bolts to be regulated with precision in relation to the guide rack means 8 which embraces the sleeve 4.

The device described can easily be adapted for the fitting of any captive member to a part having a portion adapted to withdraw the captive member from a stack.

What is claimed is:

1. Apparatus for automatically fitting captive members on mechanical parts comprising:

a. means for forming a vertical pile of said captive members and for presenting them one by one and for forming a pick-up station situated at the top of the vertical pile;

b. an inclined slideway passing over said pick-up station and one end of each mechanical part being engaged in said slideway so that as said parts slide theredown the other end of each mechanical part in turn passes said pick-up station and engages and picks-up the top most captive member of the pile thereof, and c. guide rack means embracing said pick-up station and inclined with respect to said slideway for causing each captive member upon becoming engaged on the other end of a corresponding mechanical part to be moved along said guide rack means and to be progressively moved towards said one end of the corresponding mechanical part as the part continues moving down said slideway.

2. Apparatus according to claim 1, in which said means for forming a vertical pile and a pick-up station comprises a vibratable bowl containing said captive members, a tube having one end disposed in relation to said bowl so that, due to the vibration of same, said captive members rise up in the bowl and are fed into and along said tube, the other end of said tube being disposed to rise to said pick-up station and to end at a level lower than said one end thereof, and a sleeve with lip means mounted on said other end of said tube for temporarily preventing exit therefrom of the captive members but permitting each top most captive member to be engaged and removed by said other end of a said mechanical part.

3. Apparatus according to claim 2, further comprising means for regulating the height of said bowl and said one end of said tube relative to said other end of said tube so as to regulate the rate of delivery of said captive members.

4. Apparatus according to claim 2, in which said tube is flexible.

5. Apparatus according to claim 1, in which said pick-up station comprises a sleeve with lip means mounted at one end of the vertical pile of captive members rising to said pick-up station.

6. Apparatus according to claim 1, in which means are provided for adjusting the angle of inclination and the position of said guide rack means in relation to said pick-up station.

7. Apparatus according to claim 1, in which said captive members are washers and said mechanical parts are bolt blanks.

* * * * *